(12) United States Patent
Kwon

(10) Patent No.: US 11,392,910 B2
(45) Date of Patent: Jul. 19, 2022

(54) SPARE CHANGE SAVING SYSTEM AND METHOD THEREFOR

(71) Applicant: OODDY CO., LTD, Gyeonggi-do (KR)

(72) Inventor: Bong Kyun Kwon, Gyeonggi-do (KR)

(73) Assignee: OODDY CO., LTD, Gyeonggi-Do (KR)

( * ) Notice: Subject to any disclaimer, the term of this patent is extended or adjusted under 35 U.S.C. 154(b) by 0 days.

(21) Appl. No.: 16/481,453

(22) PCT Filed: Jan. 9, 2018

(86) PCT No.: PCT/KR2018/000427
§ 371 (c)(1),
(2) Date: Jul. 26, 2019

(87) PCT Pub. No.: WO2018/216877
PCT Pub. Date: Nov. 29, 2018

(65) Prior Publication Data
US 2019/0362327 A1 Nov. 28, 2019

(30) Foreign Application Priority Data
May 22, 2017 (KR) .................. 10-2017-0063171

(51) Int. Cl.
*G06Q 20/10* (2012.01)
*G06Q 20/06* (2012.01)
(Continued)

(52) U.S. Cl.
CPC ......... *G06Q 20/108* (2013.01); *G06Q 20/065* (2013.01); *G06Q 20/381* (2013.01); *G06Q 40/02* (2013.01)

(58) Field of Classification Search
CPC ........ G06Q 40/02; G06Q 20/10; G06Q 40/00; G06Q 20/06; G06Q 20/108; G06Q 20/065; G06Q 20/381
(Continued)

(56) References Cited

U.S. PATENT DOCUMENTS 7,899,750 B1 * 3/2011 Klieman ............. G06Q 20/102
705/40
8,612,324 B1 * 12/2013 Bent .................... G06Q 20/042
705/35
(Continued)

FOREIGN PATENT DOCUMENTS

EP 2 209 098 7/2010
JP 2004-30451 1/2004
(Continued)

OTHER PUBLICATIONS

Yoo, "How to Design Cryptocurrency Value and How to Secure its Sustainability in the Market", ProQuest Doc. Id: 253291872, Journal of Risk and Financial Management, 14.5:210, MDPI AG ProQuest Doc. Id: 253291872, (Year: 2021).*
(Continued)

*Primary Examiner* — Frantzy Poinvil
(74) *Attorney, Agent, or Firm* — Ladas & Parry, LLP

(57) ABSTRACT

The present invention relates to a spare change saving system and a method therefor and, more particularly, to a spare change saving system for enabling a user to save, in an allocated user account of a saving server, spare change remaining after using money, wherein the saving server receives deposit information when the spare change is put into a saving device, the user receives, from the saving server, a saving code corresponding to the deposit information and can save spare change in the allocated user account using the saving code anytime and anywhere, and spare change remaining after using money is saved as cyber
(Continued)

money and can be freely converted into the type of currency desired by the user and used in future.

9 Claims, 8 Drawing Sheets

(51) Int. Cl.
*G06Q 20/38* (2012.01)
*G06Q 40/02* (2012.01)
(58) Field of Classification Search
USPC ........................................ 705/3–44
See application file for complete search history.

(56) References Cited

U.S. PATENT DOCUMENTS

| | | | |
|---|---|---|---|
| 10,636,083 B1 * | 4/2020 | Wang | G06Q 40/00 |
| 10,963,972 B1 * | 3/2021 | Gambale | G06Q 40/12 |
| 2003/0078094 A1 | 4/2003 | Gatto et al. | |
| 2003/0199312 A1 * | 10/2003 | Walker | G07F 17/3239 463/25 |
| 2009/0242626 A1 | 10/2009 | Jones et al. | |
| 2009/0320106 A1 | 12/2009 | Jones et al. | |
| 2010/0174641 A1 * | 7/2010 | Cole | G07F 19/202 705/39 |
| 2012/0254026 A1 * | 10/2012 | Lotzer | G06Q 20/10 705/41 |
| 2015/0032619 A1 * | 1/2015 | Castinado | G06Q 20/227 705/44 |
| 2016/0267597 A1 * | 9/2016 | Johansen | G06Q 50/01 |
| 2016/0328692 A1 | 11/2016 | Camps et al. | |
| 2017/0178113 A1 * | 6/2017 | Mugford | G06Q 20/102 |
| 2018/0240192 A1 * | 8/2018 | Castineiras | G06Q 40/06 |

FOREIGN PATENT DOCUMENTS

| | | |
|---|---|---|
| JP | 2010-146304 | 7/2010 |
| JP | 2012-168611 | 9/2012 |
| JP | 2016-91396 | 5/2016 |
| KR | 10-2006-0014864 | 2/2006 |
| KR | 20060014864 A * | 2/2006 |
| KR | 20140069863 A * | 6/2014 |
| KR | 10-2014-0122291 | 10/2014 |
| KR | 10-2016-0024700 | 3/2016 |
| KR | 10-2016-0028279 | 3/2016 |
| KR | 10-2016-0144192 | 12/2016 |

OTHER PUBLICATIONS

International Search Report for PCT/KR2018/000427 dated Apr. 19, 2018 and its English translation from WIPO (now published as WO2018/216877).
Written Opinion of the International Searching Authority for PCT/KR2018/000427 dated Apr. 19, 2018 and its English translation by Google Translate (now published as WO2018/216877).
Extended European Search Report dated Jun. 25, 2020 for European Application No. 18805151.0.
Office Action dated Jun. 30, 2020 for Japanese Patent Application No. 2019-539909 and its English translation by Google Translation.
International Preliminary Report on Patentability (Chapter I) for PCT/KR2018/0427 dated Nov. 26, 2019 and its English translation from WIPO.

* cited by examiner (a)

(b)

(a)

(b)

(a)

(b)

US 11,392,910 B2

SPARE CHANGE SAVING SYSTEM AND METHOD THEREFOR

CROSS-REFERENCE TO RELATED APPLICATIONS

This application is the U.S. national phase of PCT Application No. PCT/KR2018/000427 filed on Jan. 9, 2018, which claims priority to Korean Patent Application No. 10-2017-0063171, filed on May 22, 2017, the entire contents of which are incorporated herein by reference.

TECHNICAL FIELD

The present disclosure relates to a system and a method for saving spare change, and more particularly, to a system for saving spare change in which, when a user inserts spare change into a saving server so as to save spare change remaining after using money in an allocated user account of a saving server, deposit information may be transmitted to the saving server, and the user may receive a saving code corresponding to the deposit information from the saving server, whereby the user may save spare change in the allocated user account through a saving code anytime and anywhere, may save spare change remaining after use as cyber currency, and may freely change the spare change into a type of currency desired by the user to use the spare change.

BACKGROUND ART

As the use of credit cards has increased, the use of cash has relatively decreased. When goods or services are purchased in cash and coins are received in change, the received coins should be stored in a wallet or a pocket. Thus, many people experience inconvenience in receiving coins.

In addition, whenever coins are received at the time of a cash payment, coins may frequently be stored in a space rather than a wallet, causing a large amount of coins to disappear. Since a money issuance cost per coin is generally higher than the face value of a single coin, coins must be continuously issued due to the loss of coins, and thus, the money issuance cost is wasted.

In particular, as international travel is becoming common, and the globalization of the world economy is being realized, the number of people traveling or going on business trips to foreign countries is increasing every year. When a user travels abroad, users are likely to change a local currency into a foreign currency to be used in a foreign country in advance or change their local currency in the foreign country and return home with foreign coins unused in the foreign country.

Foreign coins may be changed into Korean Won in a domestic or foreign bank. Coins exchangeable into Korean Won are limited depending on the country, however, and a large fee should be paid to exchange foreign coins into won.

That is, there is no real way to collect travelers' coins such as yen and dollar coins except for banks, and banks exchange coins into an amount of money corresponding to 50% of an exchange rate. Due to the expense or insurance cost of exporting coins back to the country of origin, the export cost of coins is about 70% of the face value of coins, which is more expensive than an exchange amount. Thus, banks are reluctant to exchange foreign coins. Therefore, typically, a user is forced to store the spare change at home or donate the spare change to a donor box provided in a departure gate, rather than exchanging the foreign spare change remaining after use.

Recently, a business method of allowing persons to exchange foreign coins by a single application on mobile devices or the Internet has been proposed. The business method provides a service in which, when persons with foreign coins input a country name and an amount of the foreign coin, a home address, and a mobile phone number using a corresponding mobile application, addresses of application customers are automatically classified using a postal code to manage the number and amount of coin exchange applications. When customer orders for each region exceed a certain level, corresponding customers are informed of a visit date for exchange, so that the foreign coins are collected at once. However, even in the case of such a business method, coins are exchanged into an amount of money corresponding to 50% of an exchange rate, and it is inconvenient to wait until the number of customers applying for a currency exchange in a specific region is greater than or equal to a certain number or an amount of coins exceeds a certain amount.

DISCLOSURE

Technical Problem

Accordingly, the present disclosure has been made in consideration of the above-described problems occurring in the related art, and the present disclosure proposes a system for saving spare change, in which spare change remaining after use is saved in an allocated user account of a saving server.

Accordingly, the present disclosure has been made keeping the above-described problems occurring in the related art in consideration, and the present disclosure proposes a system for saving spare change, in which spare change is inserted into a saving device, deposit information is transmitted to a saving server, and a user receives a saving code corresponding to the deposit information from the saving server. Accordingly, the user can save the spare change in the allocated user account using the saving code anytime and anywhere.

Accordingly, the present disclosure has been made keeping the above-described problems occurring in the related art in consideration, and the present disclosure proposes a system for saving spare change, in which a spare change remaining after use may be saved as cyber currency and may be freely changed into a type of currency desired by the user to be used in the future.

Accordingly, the present disclosure has been made keeping the above-described problems occurring in the related art in consideration, and the present disclosure proposes a system for saving spare change, allowing a user to securely save spare change by matching a deposit identifier input by the user when saving the spare change a deposit code provided by a saving server.

Technical Solution

According to an aspect of the present disclosure, a system of saving spare change includes a saving device; and a saving server. The saving device generates deposit information of inserted spare change and transmits the deposit information to the saving server.

The saving server generates a saving code including the deposit information, transmits the generated saving code to the saving device, determines whether a saving code received from a user terminal matches the generated saving code, and saves the spare change in a user account allocated to a user.

The saving device according to the present invention may include an identification element determining inserted spare change; a deposit manager counting the identified spare change and generating deposit information; and an information manager transmitting the deposit information to the saving server and providing a saving code to the user when the saving code including the deposit information is received from the saving server.

The saving device may further include a user interface by which a user command is input, and the identification element determines a type of currency based on a currency type selection command input through the user interface and identifies the inserted spare change according to the determined type of currency.

The deposit manager may receive a deposit identifier formed of numerals or characters of six digits or less input through the user interface, and generate deposit information including the deposit identifier and a total amount of the counted spare change.

The information manager may output a deposit receipt including the saving code and provides the deposit receipt to the user.

The saving server may include a saving code manager generating a saving code corresponding to the deposit information when the deposit information is received, mapping a deposition identifier extracted from the deposit information to the generated saving code, and registering and storing the mapped deposition identifier in a database; a matching determiner determining whether or not the saving code received from the user terminal matches the generated saving code and determining whether or not the deposit identifier received from the user terminal matches the deposit identifier mapped to the saving code; and a saving manager saving the spare change when the saving codes match each other and the deposit identifiers match each other.

The saving manager may receive user information and information on a type of saved currency from the user terminal, and change the spare change into the type of the saved currency to store the spare change in a user account determined from the user information.

Advantageous Effects

A system for saving spare change according to the present disclosure has the following effects.

First, in the system for saving spare change according to present disclosure, a user can save spare change remaining after use in an allocated user account of a saving server and thus can conveniently and easily save and use remaining spare money.

Second, in the system for saving spare change according to present disclosure, spare change is inserted into a saving device, information is transmitted to a saving server, and a user receives a saving code corresponding to the deposit information from the saving server, so that the user can save the spare change in an allocated user account using the saving code anytime and anywhere.

Third, in the system for saving spare change according to present disclosure, spare change remaining after use can be saved as cyber currency and a user can directly select a type of currency to be saved through a saving server, so that the user can freely change the spare change into a desired type of currency to use.

Fourth, in the system for saving spare change according to the present disclosure, a user can save spare change by determining whether or not a deposit identifier input by the user when saving the spare change matches a deposit code provided by a saving server. Thus, even in the case that the user loses the saving code, illegal use by a third party can be prevented to securely save the spare change.

MODE FOR INVENTION

The technical or scientific terms used herein are for the purpose of describing particular exemplary embodiments only and are not intended to be limiting of the present disclosure. In addition, the technical or scientific terms used herein should be understood as having the same meaning as that commonly understood by a person skilled in the art to which the present disclosure relates, and should not be interpreted in an overly broad or narrow manner, unless defined expressly so herein. If any technical terms used herein fail in correctly representing the idea of the present disclosure, they should be substituted with technical terms correctly understandable by a person skilled in the art to which the present disclosure relates.

Descriptions of components in the singular form used herein are intended to include descriptions of components in the plural form, unless explicitly described to the contrary. It will be understood that the terms "comprise," "include," and any variations thereof used herein shall not be interpreted as essentially including all components or steps described herein, and are intended to cover non-exclusive inclusions unless explicitly described to the contrary.

In addition, the accompanying drawings shall be interpreted as being provided for a better understanding, while not being limitative, of the principle of the present disclosure.

Hereinafter, a method and a system for saving spare change according to the present disclosure will be described in detail with reference to the accompanying drawings.

Figure 1:
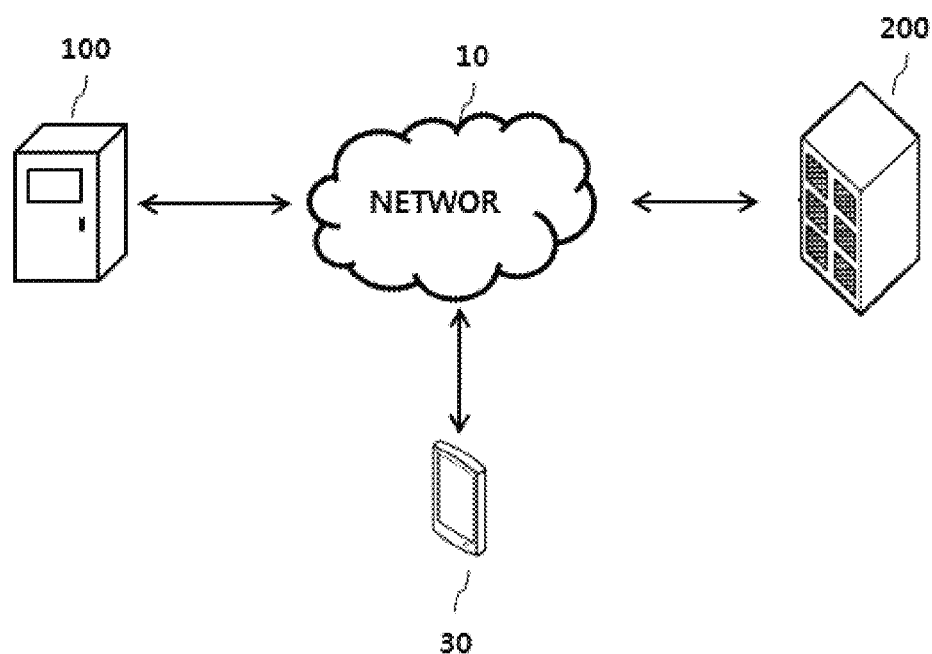
FIG. 1 is a diagram illustrating a system for saving spare change according to an embodiment of the present disclosure.

FIG. 1 is a diagram illustrating a system for saving spare change according to an embodiment of the present disclosure.

Describing in more detail with reference to FIG. 1, a saving device 100, a saving server 200, and a user terminal 30 carried by a user are connected to a network 10. Here, the network 10 may include various types of wired or wireless networks capable of transmitting and receiving data between the saving device 100 and the saving server 200 or between the user terminal 30 and the saving server 200.

The saving device 100 is a device installed in a place in which spare change is collected. For example, the saving device 100 is installed in a department store, a theater, or the like, a space used by many people, a shopping center, a convenience store, or the like, in which spare change is received, and a place, i.e., a departure gate of an airport or a harbor, in which spare change carried by the user leaving the country is collected. The saving device 100 generates deposit information on spare change carried by the user, transmits the deposit information to the saving server 200 through the network 10, and outputs a saving code received from the saving server 200 through the network 10 to the user. Here, the saving code includes the deposit information. Desirably, the saving code may include a quick response (QR) code, a bar code, a saving identifier made of a combination of numerals and characters, and the like, including the deposit information.

The user terminal 30 may be a smartphone or a notebook computer carried by the user and is capable of transmitting information or outputting received information. The user receives a receipt, in which the saving code is written, from the saving device 100. The user accesses the saving server 200 using the user terminal 30 at a convenient time and in a convenient place, and transmits the saving code to the saving server 200 to save spare change corresponding to deposit information of the saving code in a user account.

The user may collect an amount of money saved in the user account of the saving server 200 and use the saved amount of money to purchase a desired item in the future, present the saved amount of money to a near acquaintance in a community, or change the saved amount of money into a desired type of currency to use.

Figure 2:
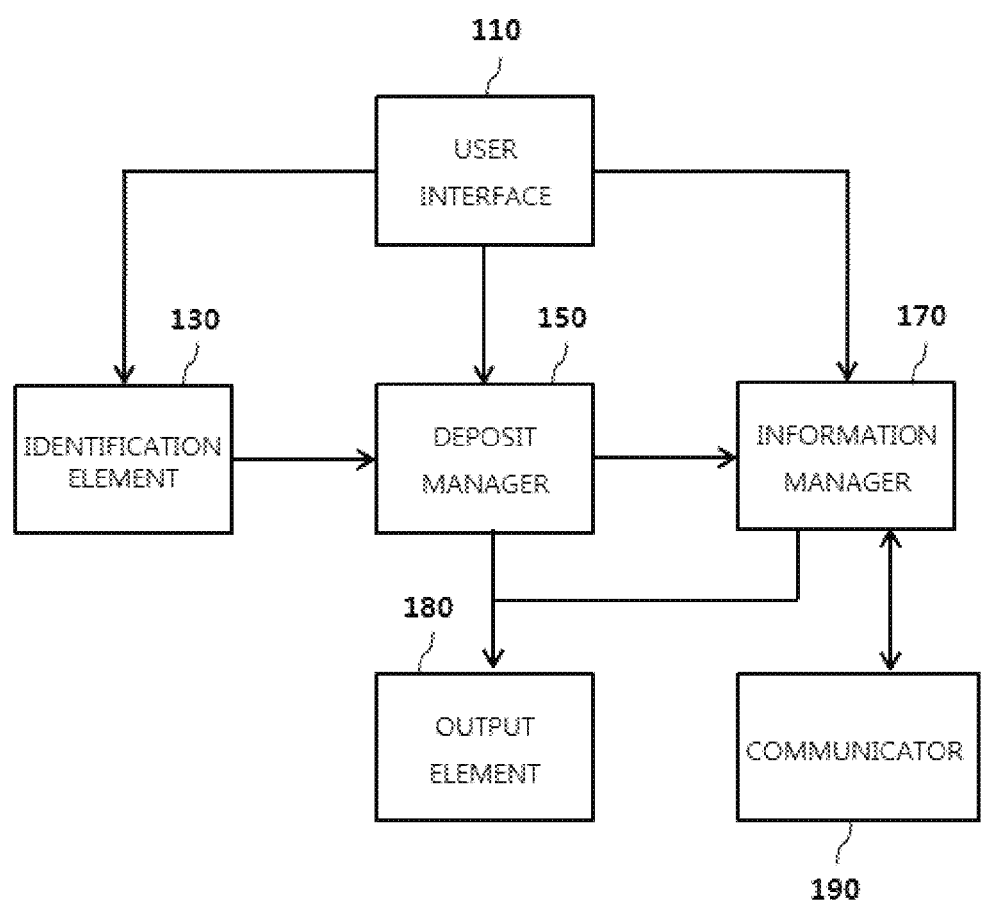
FIG. 2 is a functional block diagram illustrating an example of a saving device according to the present disclosure.

FIG. 2 is a functional block diagram illustrating an example of the saving device according to the present disclosure.

Describing in more detail with reference to FIG. 2, when a user selection command for selecting a type of currency to be saved is input through a user interface 110, an identification element 130 identifies a currency inserted into a slot based on a type of currency selected according to the user selection command. A currency commonly used domestically may be used through the user interface 110. However, according to a field to which the present disclosure is applied, when the saving device is disposed in a departure gate, currencies of various countries may be selected. A gift voucher, a department store gift card, and the like, not used immediately, may be used as an example of a currency. Like spare change, small marketable securities such as a gift voucher and a department store gift card may also be saved in the saving device for future use.

A deposit manager 150 counts identified spare change to calculate the total amount of the inserted spare change and generate deposit information including the total amount of the inserted spare change. The deposit information is output to the user through an output element 180, and the user can check the output deposit information.

An information manager 170 transmits the deposit information checked by the user to the saving server through a communicator 190. When saving information is received from the saving server, the information manager 170 outputs the received saving information to the user through the output element 180.

Figure 7:
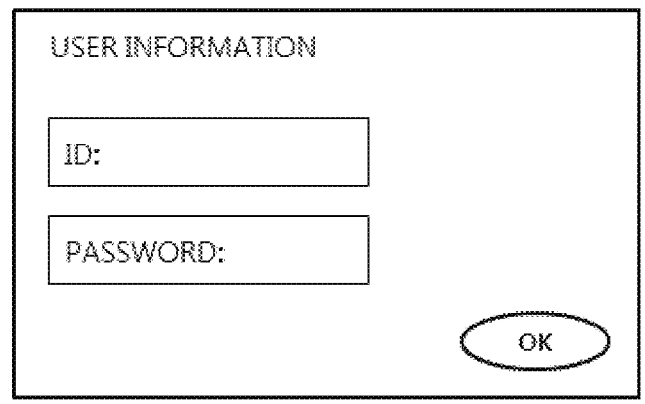
FIG. 7 illustrates an example of a user interface screen activated in a saving device.
Figure 7:
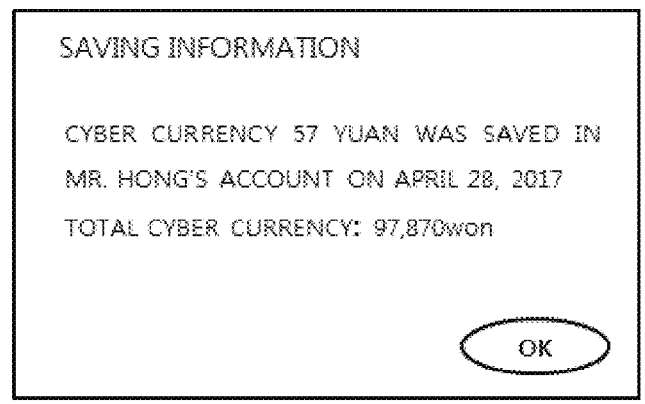

As an example of saving spare change, user information such as a user identification (ID) or a password may be directly input to the saving device through the user interface 110. The information manager 170 may transmit the user information together with the deposit information to the saving server. In this case, the information manager 170 may receive saving information such as user account information, a saved amount, or a total cumulative saved amount allocated to the user information from the saving server and may output the received saving information to the user through the output element 190. FIG. 7A illustrates an example of a user interface screen activated in the saving device so as to input user information in an example of saving spare change, and FIG. 7B illustrates an example of the user interface screen for outputting saving information received from the saving server based on user information.

As another example of saving spare change, a user does not need to directly input user information to the saving device so as to save spare change. When a saving code including deposit information is received from the saving server, the received saving code may be output to the user through the output element 190. In this case, the user may transmit the user information and the saving code to the saving server through the user terminal later and may save spare change corresponding to saving information of a saving code matching a user account searched for from the user information.

Desirably, in another example of saving the spare change, a user may input a deposit identifier comprised of numbers or characters through the user interface 110, and the deposit manager 150 may generate deposit information including the deposit identifier.

Figure 3:
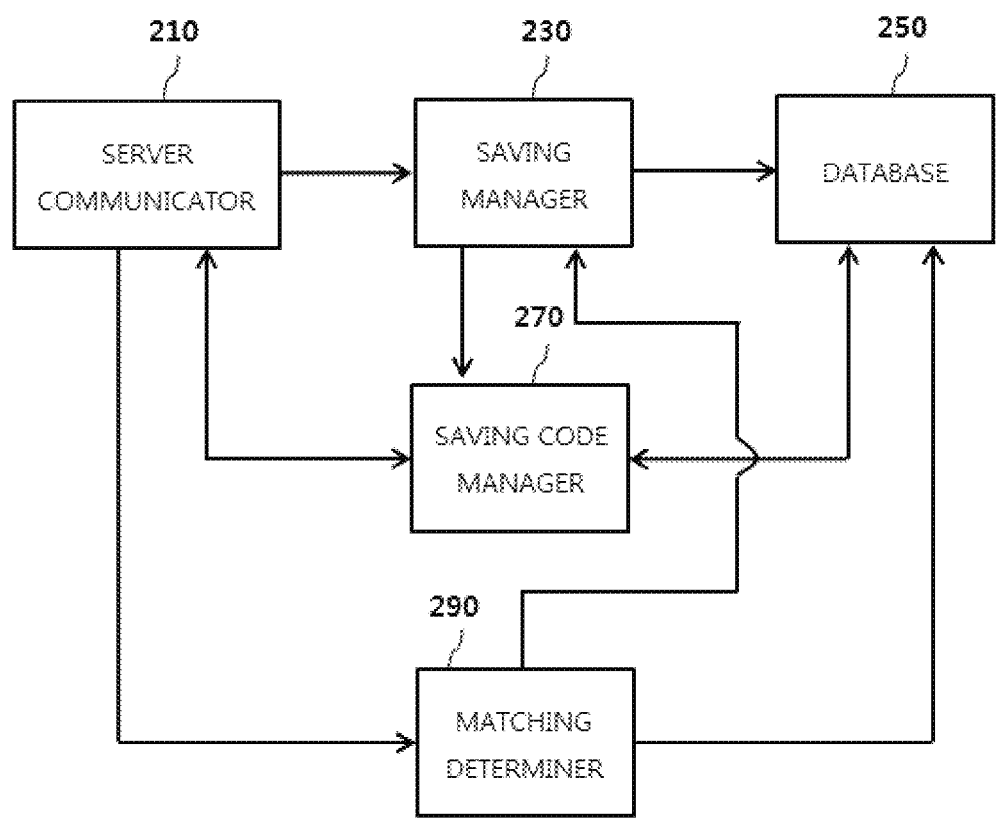
FIG. 3 is a functional block diagram illustrating an example of a saving server according to the present disclosure.

FIG. 3 is a functional block diagram illustrating an example of the saving server according to the present disclosure.

Describing in more detail with reference to FIG. 3, when deposit information is received from the saving device through a server communicator 210, a saving manager 230 determines whether or not user information is received together with the deposit information. When the user information is received simultaneously with the deposit information, a user account allocated to the user information is searched for in a database 250 based on the user information, and spare change corresponding to the deposit information is saved in the found user account.

However, when it is determined that the user information is not received simultaneously with the deposit information in the saving manager 230, a saving code manager 270 generates saving information corresponding to deposit information and maps, registers, and stores the generated saving code and the deposit information in the database 250. Desirably, the saving code manager 270 may extract a deposit identifier from deposit information received from the saving device, map the extracted deposit identifier to the generated saving code, and register and store the mapped deposit identifier in the database 250.

When the saving code and the user information are received from the user terminal through the server communicator 210, a matching determiner 290 searches the database 250 for a saving code that matches a saving code received from the user. Desirably, the matching determiner 290 may receive information on a deposit identifier together with a saving code from the user terminal through the server communicator 210. The matching determiner 290 may determine whether or not a deposit identifier mapped to a saving code matching the saving code received from the user terminal matches the deposit identifier received from the user terminal.

When the saving codes match each other and the deposit identifiers match each other, the saving manager 230 searches the database 250 for a user account corresponding to user information and saves spare change corresponding to deposit information of a saving code in a discovered user account.

Figure 4:
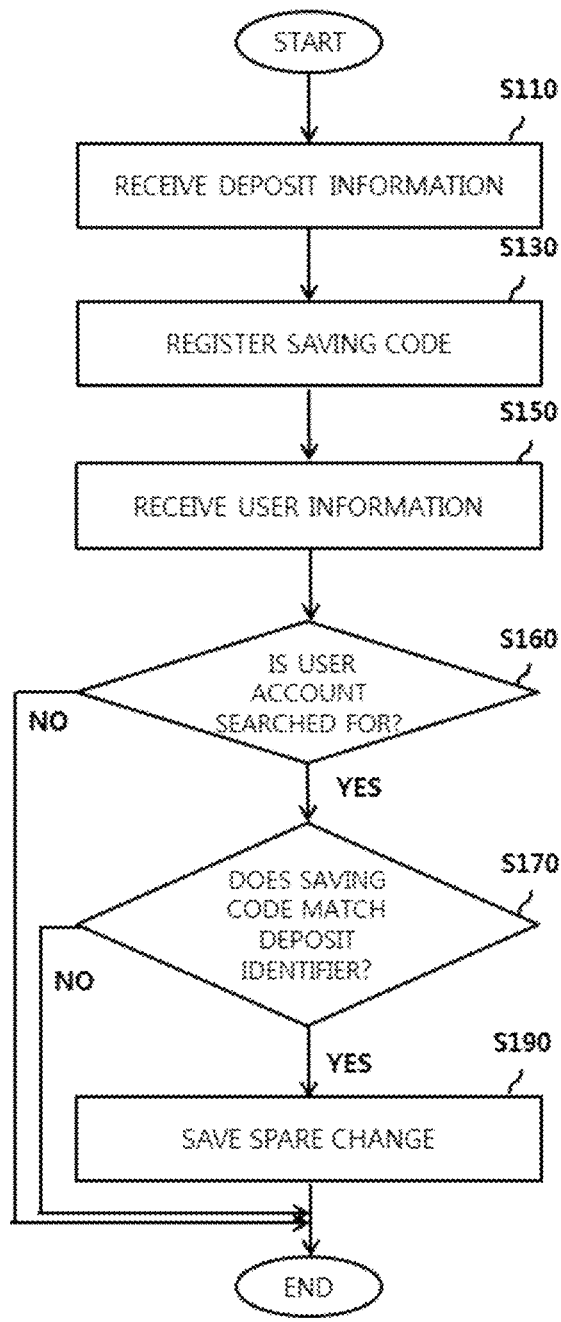
FIG. 4 is a flowchart illustrating a method of saving spare change in a saving server according to an embodiment of the present disclosure.

FIG. 4 is a flowchart illustrating a method of saving spare change in a saving server according to an embodiment of the present disclosure.

Figure 5:
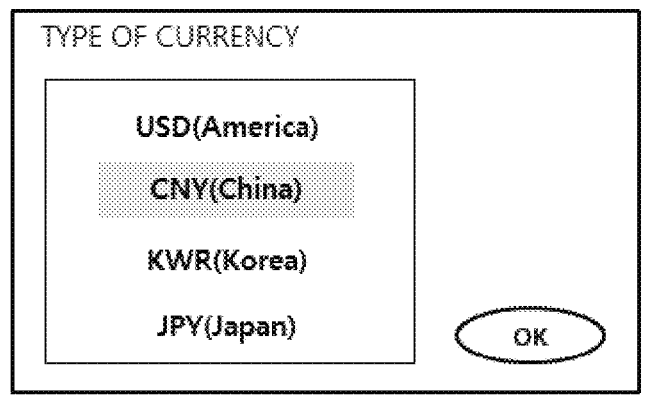
FIG. 5 illustrates an example of a user interface screen for generating deposit information in a saving device.
Figure 5:
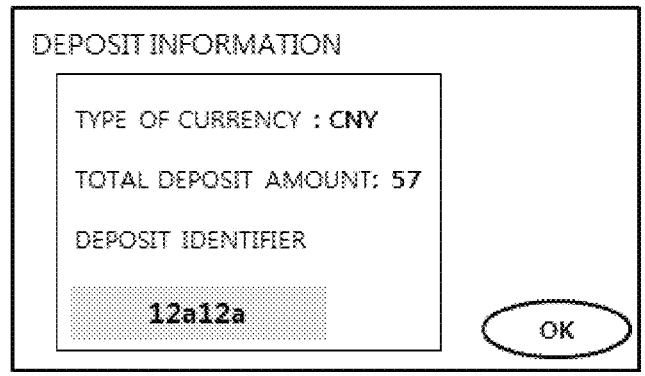

Describing in more detail with reference to FIG. 4, deposit information of spare change inserted by a user is received from a saving device in S110. FIG. 5 illustrates an example of a user interface screen for generating deposit information in the saving device. As shown in FIG. 5A, the user first selects a type of currency through the user interface screen on which types of currencies are displayed. After the type of currency is selected, when spare change of the selected type of the currency is inserted, the saving device identifies the spare change and then generates deposit information as shown in FIG. 5B. The deposit information may include a type of currency, a total deposit amount, and a deposit identifier for preventing illegal use by a third party. When the user checks the deposit information through the user interface screen which is outputting the deposit information, the deposit information is transmitted from the saving device to the saving server.

Figure 6:
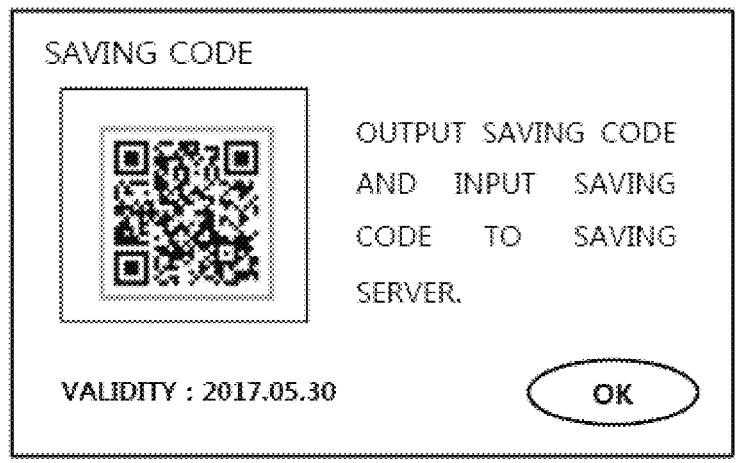
FIG. 6 illustrates an example of a saving code provided to a saving device from a saving server.
Figure 6:
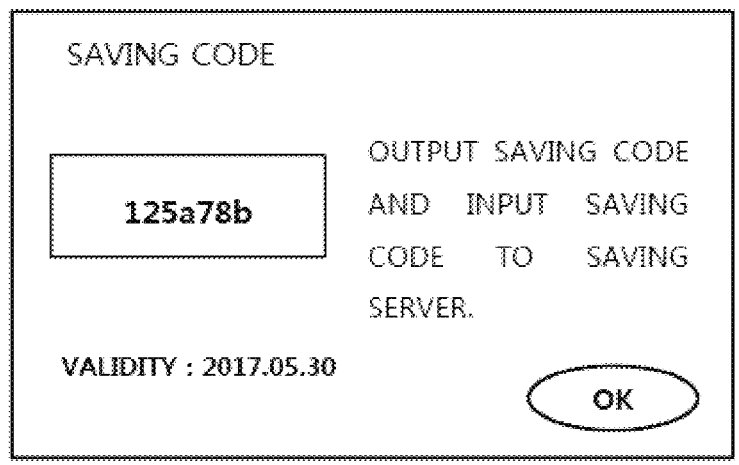

Referring to FIG. 4 again, when the deposit information is received, a saving code corresponding to the deposit information is generated, and the generated saving code is mapped to the deposit information and is registered and stored in a database in S130. The saving code may be generated as a QR code, a bar code, or a saving identifier. FIG. 6 illustrates an example of a saving code provided to the saving device from the saving server. As shown in FIG. 6A, the saving server may generate a saving code corresponding to deposit information in the form of QR and may provide the generated saving code to the saving device. Alternatively, as shown in FIG. 6B, the saving server may generate a saving code corresponding to deposit information as a saving identifier formed of characters and numerals and may provide the generated saving code to the saving device.

When user information is received from a user terminal in S150, it is determined whether a user account corresponding to the received user information is searched for in a database in S160. When the user account corresponding to the user information is not searched for in the database, new user information may be requested to the user terminal.

When the user account corresponding to the user information is searched for, it is determined whether or not a saving code and a deposit identifier matching a saving code and a deposit identifier received from the user terminal are registered and stored in the database in S170. The saving server extracts a deposit identifier from deposit information received from the saving device, maps the extracted deposit identifier to the generated saving code, and registers and stores the mapped deposit identifier. The saving server determines whether the saving code received from the user terminal matches the saving code registered and stored in the database and determines whether the deposit identifier mapped to the matched information matches the deposit identifier received from the user terminal. As described above, even if the deposit codes match each other, whether or not the deposit identifiers match each other may be taken into account. Thus, after the user receives a receipt printed with a saving code from the saving device, even when the user loses the receipt or a third party attempts to steal the saving code, it is possible to prevent the third party from illegally saving and using spare change of the user through the deposit identifier.

When the saving codes match each other and the identifiers match each other, spare change of the deposit information is saved in the found user account in S190.

Figure 8:
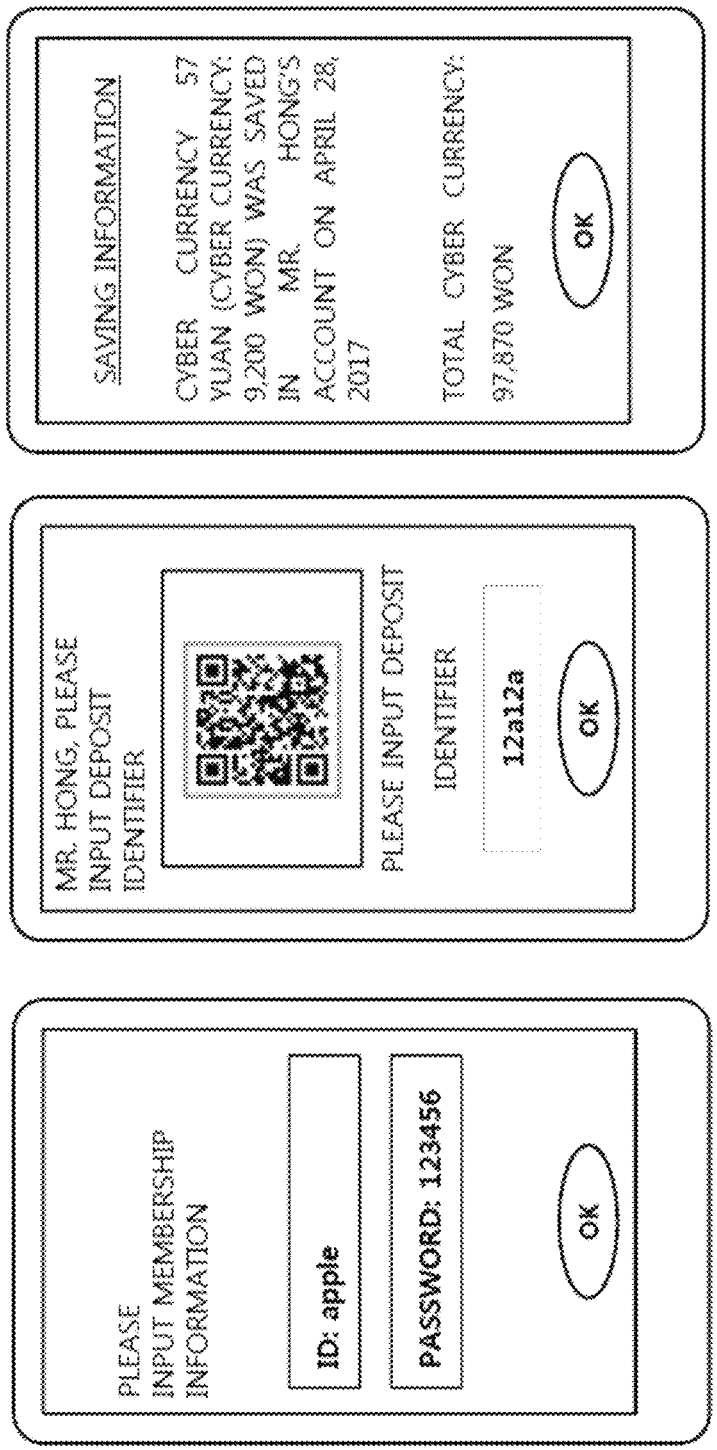
FIG. 8 illustrates an example of a user interface screen provided to a user terminal from a saving server in order to save spare change.

FIG. 8 illustrates an example of a user interface screen provided from the saving server to the user terminal so as to save spare change. As shown in FIG. 8A, user information such as an ID and a password of a user is input through the user interface screen. As shown in FIG. 8B, the user inputs a saving code and a deposit identifier through the user interface screen. As shown in FIG. 8C, saving information of the user received from the saving server is output through the user interface screen Desirably, when spare change is a foreign currency and the foreign spare change is saved in the saving server, the saving server may save spare change of the deposit information by changing the spare change into cyber currency according to a basic cyber exchange rate. The basic cyber exchange rate may be calculated differently according to a user level according to user information and an actual basic exchange rate. That is, the user level may be classified into higher, middle, and lower levels. As the user level becomes higher, the basic cyber exchange rate may be calculated to be higher.

For example, in a case in which the dollar is used as a base currency, one dollar may be calculated at a basic cyber exchange rate of 10. In this case, a cyber exchange rate may be calculated in consideration of weighting according to the user level and an actual exchange rate between the dollar and the yuan at a point in time at which the spare change in yuan is saved.

In the present disclosure, irrespective of the type of currencies of spare change, all types of spare change can be exchanged into the same cyber currencies to be saved. Since the spare change is exchanged into the cyber currency to be saved, a user may purchase an item using the cyber currency in other servers using the cyber currency, may present the cyber currency to a near acquaintance, or may easily use the saved cyber currency in consideration of a type of currency into which the user changes the cyber currency and an actual exchange rate of a time at which the user changes the cyber currency.

The foregoing embodiments of the present disclosure may be written as computer programs and be implemented in general-use digital computers that execute the programs using a computer readable recording medium.

Examples of the computer readable recording medium include magnetic storage media (e.g. read-only memories (ROMs), floppy disks, and hard disks), optical recording media (e.g. compact disc read-only memories (CD-ROMs) and digital versatile discs (DVDs)), and storage media such as carrier waves (e.g. transmission through the Internet).

While the present disclosure has been described with reference to certain exemplary embodiments shown in the drawings, these embodiments are illustrative only. Rather, it will be understood by a person skilled in the art that various modifications and equivalent other embodiments may be made therefrom. Therefore, the true scope of the present disclosure shall be defined by the concept of the appended claims.

The invention claimed is:

1. A system of saving spare change, the system comprising:
    a network configured to connect between a saving device and a saving server;
    the saving device comprising an user interface for receiving a currency type selection command from a user and configured to determine a type of currency based on the currency type selection command inputted through the user interface, identify inserted spare change according to the determined type of currency, and generate deposit information of the inserted spare change, the saving device further comprising a device communicator configured to transmit the deposit information of the inserted spare change and/or user information to the saving server through the network;
    the saving server comprising a server communicator configured to receive the deposit information of the inserted spare change and/or the user information which is/are transmitted by the device communicator of the saving device through the network, and a database storing a plurality of user accounts and a plurality of saving codes, the saving server configured to:
    determine whether or not the user information is simultaneously received with the deposit information of the inserted spare change by the saving server,
    when the user information is simultaneously received with the deposit information of the inserted spare change by the saving server, search for a user account corresponding to the user information in the database, and deposit the inserted spare change to the searched user account corresponding to the user information simultaneously received with the deposit information of the inserted spare change in the database, and
    when the user information is not simultaneously received with the deposit information of the inserted spare change by the saving server, generate a saving code corresponding to the deposit information of the inserted spare change and store the generated saving code corresponding to the deposit information of the inserted spare change in the database, transmit the generated saving code to the saving device through the network by the sever communicator of the saving server, determine whether a saving code received from a user terminal matches the generated saving code stored in the database, and deposit the spare change to a user account allocated to a user of the user terminal in the database according to a determination that the saving code received from the user terminal matches the generated saving code.

2. The system of claim, 1, wherein the saving device includes:
    an identification element determining inserted spare change;
    a deposit manager counting the identified spare change and generating deposit information; and
    an information manager transmitting the deposit information to the saving server and providing a saving code to the user when the saving code including the deposit information is received from the saving server.

3. The system of claim 2, wherein the deposit manager receives a deposit identifier formed of numerals or characters of six digits or less input through the user interface, and generates deposit information including the deposit identifier and a total amount of the counted spare change.

4. The system of claim 2, wherein the information manager outputs a deposit receipt including the saving code and provides the deposit receipt to the user.

5. The system of claim 3, wherein the saving server includes:
    a saving code manager generating a saving code corresponding to the deposit information when the deposit information is received, mapping a deposition identifier extracted from the deposit information to the generated saving code, and registering and storing the mapped deposition identifier in the database;
    a matching determiner determining whether or not the saving code received from the user terminal matches the generated saving code and determining whether or not the deposit identifier received from the user terminal matches the deposit identifier mapped to the saving code; and
    a saving manager saving the spare change when the saving codes match each other and the deposit identifiers match each other.

6. The system of claim 5, wherein the saving manager receives user information and information on a type of saved currency from the user terminal, and
    changes the spare change into the type of the saved currency to store the spare change in a user account determined from the user information.

7. A method of saving spare change, the method comprising:
    providing a user interface for receiving a currency type selection command from a user, wherein the user interface is included in a saving device,
    determining by the saving device, a type of currency based on the currency type selection command inputted through the user interface, identifying inserted spare change according to the determined type of currency, generating deposit information of the inserted spare change, and transmitting, by a device communicator comprised in the saving device, the deposit information of the inserted spare change and/or user information to a saving server through the network;
    receiving, by a server communicator comprised in the saving server, deposit information of spare change and/or user information from the saving device through a network connecting between the saving device and the saving server;
    determining, by the saving server, whether or not the user information is simultaneously received with the deposit information of the spare change by the saving server;
    when the user information is simultaneously received with the deposit information of the spare change by the saving server, searching for a user account corresponding to the user information in a database storing a plurality of user accounts and a plurality of saving codes, and depositing the inserted spare change to the searched user account corresponding to the user information simultaneously received with the deposit information of the spare change in the database included in the saving server;
    when the user information is not simultaneously received with the deposit information of the spare change by the saving server, generating a saving code corresponding to the deposit information of the spare change, mapping the deposit information of the spare change to the saving code, and registering and storing the mapped deposit information in the database included in the saving server;

transmitting, by the server communicator comprised in the saving server, the saving code to the saving device through the network; and when receiving the saving code and the user information from a user terminal, searching for a user account from the user information and searching for a saving code matching the received saving code, from stored saving codes, and depositing spare change corresponding to deposit information of the spare change corresponding to the received saving code to the user account corresponding to the user information in the database included in the saving server.

8. The method of claim 7, wherein the deposit information includes information on a deposit identifier, and a deposit identifier extracted from the deposit information received from the saving device is mapped to the generated saving code and is registered and stored, and when a deposit identifier mapped to a saving code matching the saving code received from the user terminal matches a deposit identifier received from the user terminal, spare change is saved.

9. The method of claim 8, wherein, in the saving of the spare change, a total amount of the spare change corresponding to the deposit information is changed into cyber currency and is calculated based on a cyber exchange rate, and the cyber exchange rate is calculated based on a user level according to the user information or an actual exchange rate.

* * * * *